(12) United States Patent
Hoffmann et al.

(10) Patent No.: US 7,444,760 B2
(45) Date of Patent: Nov. 4, 2008

(54) MARKING DEVICE

(75) Inventors: Erhard Hoffmann, Leinfelden-Echterdingen (DE); Stefan Clauss, Leinfelden-Echterdingen (DE); Joachim Hecht, Magstadt (DE); Christian Heine, Löchgau (DE); Reiner Krapf, Reutlingen (DE); Julian Bergmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 11/628,607

(22) PCT Filed: May 3, 2005

(86) PCT No.: PCT/EP2005/052015

§ 371 (c)(1), (2), (4) Date: Dec. 4, 2006

(87) PCT Pub. No.: WO2005/121703

PCT Pub. Date: Dec. 22, 2005

(65) Prior Publication Data

US 2008/0066330 A1 Mar. 20, 2008

(30) Foreign Application Priority Data

Jun. 5, 2004 (DE) .................. 10 2004 027 646

(51) Int. Cl.
- *B25H 7/00* (2006.01)
- *G01B 7/02* (2006.01)
- *G01B 5/02* (2006.01)

(52) U.S. Cl. .............................. 33/773; 33/124; 33/679; 33/291

(58) Field of Classification Search .................... 33/291, 33/121, 122, 124, 772, 773, 775, 779, 780, 33/666, 670, 679

See application file for complete search history.

(56) References Cited

U.S. PATENT DOCUMENTS

| 2,830,378 | A | * | 4/1958 | Givan | 33/679 |
| 3,025,608 | A | * | 3/1962 | Hendrix | 33/668 |
| 3,046,884 | A | * | 7/1962 | Pearson | 33/36 |
| 5,115,569 | A | * | 5/1992 | Kubo | 33/1 M |
| 5,560,119 | A | * | 10/1996 | LeBreton | 33/773 |
| 5,577,330 | A | * | 11/1996 | Cheng | 33/772 |
| 6,029,362 | A | * | 2/2000 | Miodragovic | 33/666 |
| 6,820,343 | B2 | * | 11/2004 | Waibel et al. | 33/293 |
| 6,886,269 | B2 | * | 5/2005 | Hoffmann et al. | 33/773 |
| 7,036,241 | B2 | * | 5/2006 | Williams et al. | 33/773 |
| 2004/0068887 | A1 | | 4/2004 | Hoffmann et al. | |

FOREIGN PATENT DOCUMENTS

| DE | 197 09 146 | 9/1998 |
| DE | 102 05 000 | 8/2003 |

* cited by examiner

*Primary Examiner*—Christopher W Fulton
(74) *Attorney, Agent, or Firm*—Kenyon & Kenyon LLP

(57) ABSTRACT

A marking device, in particular a hand-held marking tool for positioning markings, comprises first means (50, 52, 54, 56) which make it possible to position the device (10) in a predefinable first position of a reference surface (16), and second means (46) for leveling the device (10) relative to the reference surface (16), as well as a tracking system (13) for determining a distance covered by the device (10) relative to the first position of the device. The tracking system (13) detects the movement of the measuring instrument (10) on the reference surface (16) in two orthogonal directions (18, 20).

12 Claims, 1 Drawing Sheet

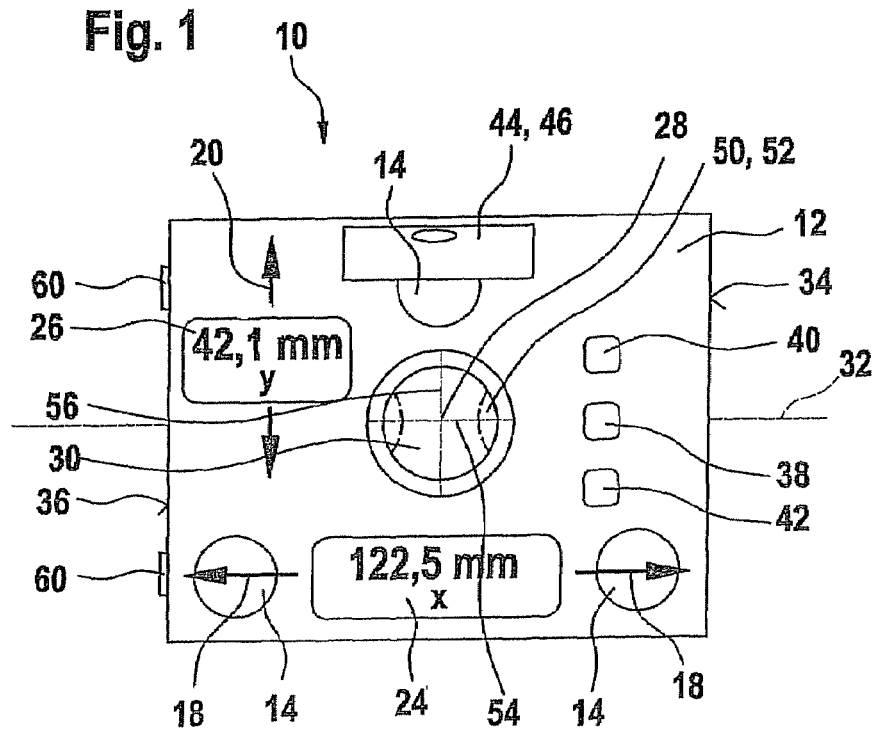
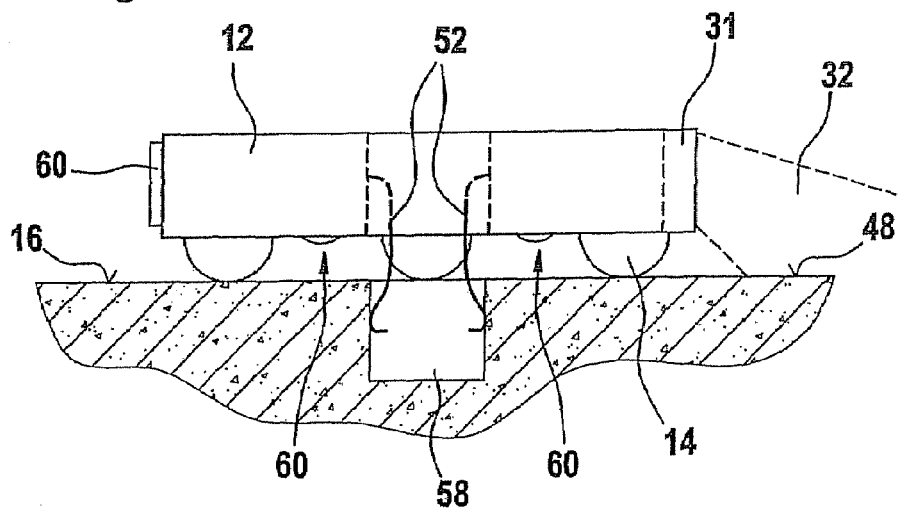

US 7,444,760 B2

MARKING DEVICE

FIELD OF THE INVENTION

The present invention is directed to a marking device.

BACKGROUND INFORMATION

Devices for positioning markings or for leveling markings on the basis of a first reference marking are used mostly with construction lasers. Thus, a typical task, for example, may be to produce two holes at a predefined distance and at a predefined level. Assuming that the first marking corresponds to a first hole to be produced later, it may be useful to many users to know where exactly the second hole is to be located and produced. This means determining the distance and the position of the second hole and all additional holes after marking or drilling the first hole.

Construction lasers of different variants are available on the market. Thus, for example, rotation lasers cover a plane in the space using a rotating, visible laser beam. Devices using manual leveling, for example via adjusting screws or bubble levels, semiautomatic, or fully automatic leveling are available. Due to this leveling, these devices make it possible to generate an exactly horizontal or vertical light signal.

Furthermore, line lasers use a laser beam that is highly divergent in a plane and, when the plane intersects a reference surface, projects a line on this reference surface, of a wall, a floor, or a ceiling, for example, without it being necessary to rotate the laser signal.

Furthermore, simple lasers having leveling capabilities such as water levels having a built-in laser function are conventional, which can be directly placed on a construction ground or can be attached to rotatable auxiliary supports or stands, like the previously described devices.

Line lasers are also conventional, which can be attached to the wall with the aid of an auxiliary device such as a nail, a screw, or a hole insert, and these can be leveled either manually with the aid of a built-in bubble level or are self-leveling using the laser pendulum principle. Such devices make it possible to project a laser beam in the previously leveled plane, for example, on a wall, in order to position the appropriate markings.

European Published Patent Application No. 1 367 364 describes a laser beam leveling device, which, together with its housing, can be placed on a reference surface. A pendulum is situated in and pivotably attached to the housing and carries at least one light source. The pendulum, under the effect of gravity, aligns the at least one light source horizontally, so that a light signal emitted by the light source generates an exactly horizontal line.

SUMMARY

The marking device according to an example embodiment of the present invention, which may be arranged as a handheld marking tool for positioning markings on surfaces such as for example walls, ceilings, floors, etc., has an arrangement making it possible to place the device in a predefinable first position of such a reference surface. This arrangement may be designed as fasteners in the form of claws, pins, brackets, clamps, nails, screws, adhesive, other conventional types of fastening devices, etc., capable of securing the device in a hole, for example. In addition, the measuring instrument has an arrangement which makes it possible to position it exactly over a predefinable first position of a reference surface. This may be a light pointer, for example, which may ensure the exact location of the marking device over a reference position. Furthermore, the marking device has an arrangement for leveling the device relative to the reference surface on which it is positioned. The device has a tracking system, which makes it possible to detect and quantitatively determine a distance traveled by the device with reference to the first position of the device.

The tracking system may detect the movement of the measuring instrument on the reference surface in two directions orthogonal to one another. By detecting the path and knowing the distance to the first predefinable position in the two orthogonal directions, it is possible, using the marking device, to make a second marking or additional markings relative to a first reference marking which are located at a defined distance to the reference marking in the exact horizontal, vertical, or diagonal direction. On the basis of a first reference marking, a first hole, for example, the user is able to make further markings, rapidly and accurately, using the marking device, for example for additional holes at a defined distance and in a defined position without having to rely on a second individual for help.

The tracking system may be arranged as a mechanical measuring system for determining the distance traveled by the device on the reference surface with respect to a first position of the device. The movement of one or more balls used for moving the device over the reference surface, in two orthogonal directions in particular, may be mechanically queried, so that the distance traveled by the device may be made available to an analyzing unit of the measuring instrument.

An optomechanical measuring system may be used for recording the distance information. In doing so, for example, the movement of one or more balls used for passing the measuring instrument over the reference surface is transmitted to a plurality of photoelectric barriers, which are able to deliver a measure for the distance traveled, for example, via the number of light interruptions.

The tracking system may have at least one ball able to roll over the reference surface and record the distance information. The measuring instrument may have three ball elements for rolling over the reference surface to enable a stable movement without the measuring instrument tipping on the reference surface. A single ball, two balls, or all balls may be scanned, the complexity of the measuring instrument increasing with the number of scanning sensors, while the distance measurement becomes more accurate, in particular in the case of rough and irregular reference surfaces. The movement of the at least one ball is scanned, for example, mechanically, optomechanically, or purely optically. In the case of purely optical tracking, no balls may be necessary as a moving aid. In such an arrangement of the measuring instrument, other aids such as, for example, felt gliders or simply just the housing base of the device may be used for passing the measuring instrument over the reference surface.

The marking device may have a display device which allows the instantaneous distance value of the device to a first, predefinable position in at least one of the orthogonal directions to be displayed. The instantaneous distance of the device to the predefinable first position in both orthogonal directions may be displayed via an output unit. In this manner, for example, a user is able to easily check whether he is at exactly the same level of the first position.

The distance value may be quantitatively specified in only one orthogonal direction via an output unit of the measuring instrument and a deviation in the second orthogonal direction relative to the first predefinable position communicated to the user via optical or acoustic device(s).

The marking device may have an optical signaling device for generating at least one piece of direction information. The optical signaling device may be formed, for example, by one or more light sources, e.g., lasers, in the form of semiconductor laser diodes, for example. The signaling device may be switched individually, and exit the housing of the device on two opposite sides of the measuring instrument, the light signals, e.g., being in a single plane.

The measuring instrument may have a device which allows the optical signaling device to be leveled relative to the reference surface for generating the direction information. Mechanical leveling devices such as a single bubble level or a plurality of bubble levels may be used, for example, for adjusting the marking device on the reference surface.

The optical signaling device may be self-leveling. This may ensure that the light signal exiting the measuring instrument is automatically leveled, so that incorrect use of the measuring instrument may be prevented. Thus, the optical signaling device may be arranged in the housing of the measuring instrument as a pendulum laser having one or more laser diodes, for example.

The marking device may additionally have a marking device which may make it possible to mark a second position on a reference surface which corresponds to the determined distance to the predefinable first position. This marker device may be designed, for example, as an integrated punch or integrated ink sprayer, which is able to apply an appropriate marking in the form of an ink spot mechanically, electronically, thermally, pneumatically, piezoceramically, etc. at the desired position, similar to an ink jet printer. Furthermore, the marking device may have an integrated opening, which is used as a marking device and through which the marking may be applied to the reference surface, for example, by drawing or scoring using a pen. This marking device may be advantageously uncoupled from the rest of the device, e.g., providing a self-leveling system similar to a self-aligning pendulum. In this manner no manual adjustment by the user using one or more bubble levels may be necessary.

The marking device may make it possible to apply a second marking on a reference surface relative to a first predefinable reference marking in a simple and reliable manner, this second marking being arranged at a defined distance to the first reference marking in the exact horizontal, vertical, or diagonal direction.

Further aspects and features of example embodiments of the present invention are described below with reference to the appended Figures.

The Figures illustrate exemplary embodiments of the marking device according to the present invention, which is to be elucidated in more detail in the description that follows. The figures of the drawing, their description, and the following contain a combination of a plurality of features. Those skilled in the art should consider these features individually and combine them into further reasonable combinations, which are hereby to be considered as also disclosed herein.

BRIEF DESCRIPTION OF THE DRAWINGS

FIG. 1 is a schematic top view of a marking device according to an example embodiment of the present invention.

FIG. 2 a cross-sectional view through the marking device illustrated in FIG. 1.

DETAILED DESCRIPTION

FIG. 1 illustrates a marking device 10 according to an example embodiment of the present invention. The marking device illustrated in FIG. 1 has an essentially parallelepiped-shaped housing 12, which may be passed over a reference surface 16 via rolling balls 14 protruding from the bottom of the housing (see FIG. 2). In the example illustrated in FIG. 1, this reference surface is parallel to the surface of the drawing's plane.

Both the shape of the housing and the number and arrangement of balls 14 may differ from that illustrated in FIG. 1.

A control and analyzing unit having a tracking system, which detects the movement of at least one ball 14 in two orthogonal directions indicated by arrows 18 and 20 and determines a distance traveled by marking device 10 in the particular direction is arranged in housing 12 of marking device 10. The distances traveled by the marking device in the two orthogonal directions 18 and 20 relative to a reference point, to which coordinates x=0 and y=0 may be assigned, are communicated to the user in the positioning device via an output unit, which as illustrated in FIG. 1 includes two optical displays 24 and 26.

On the device side, center 28 of a cylindrical opening 30 passing through housing 12 of marking device 10, which is formed by a marker device for positioning a marking on a reference surface, is defined as a reference point for the predefinable reference marking. This marker device may also be arranged, for example, as an integrated punch or integrated ink sprayer, which is able to apply an appropriate marking in the form of an ink spot mechanically, electronically, thermally, pneumatically, piezoceramically, etc. at the desired position.

Marking device 10 has optical signaling device for generating direction information, which in the exemplary embodiment illustrated in FIG. 1 is implemented in the form of a plurality of laser lines exiting from the device, which are projected in particular onto reference surface 16. Laser lines 32 may exit, for example, on two opposite sides 34 and 36 of housing 12 of marking device 10 or, also on all four sides of housing 12, for example. Similar laser lines may also be guided through opening 30 of measuring instrument 10 such that they intersect at center 28 of opening 30. In this manner, the zero point of a distance measurement is unambiguously displayed to a user of marking device 10, so that the user is able to arrange, i.e., position, the measuring instrument exactly at a predefinable desired first position of a reference surface.

Laser lines 32 may be turned on and off individually or jointly via appropriate operating controls 38. In addition to operating control 38 for optical signaling means 32, the device has at least one on/off switch 40 and a reset button 42, using which optical displays 24 and 26 may be reset to a zero or starting value. An important aspect of such a reset is the accurate horizontal alignment of marking device 10 in order to exactly define the reference point. In particular, rotations of the device about its own axis may otherwise distort the measurement result. Therefore, in the event of a reset, the measuring instrument should be aligned using a leveling unit 44, which is illustrated in FIG. 1 only symbolically as a bubble in a spirit level 46. In particular, such an alignment is to be performed in the two orthogonal directions as indicated by arrows 18 and 20. This alignment may be performed manually, i.e., with the user's eye, for example, with the aid of two orthogonally positioned bubble levels, or also electronically via automatic alignment recognition by an optical or electronic bubble level readout system or an appropriately designed slope sensor.

After aligning measuring instrument 10, the device may be moved freely over reference surface 16, for example, a wall, by hand using balls 14, the x and y components of the path traveled from the reference point (x=0, y=0) being shown by displays 24 and 26. By using multiple distance sensors, i.e., by scanning two or more balls, an intelligent electronic system of the control and analyzing unit of the marking device or an appropriate piece of software may recognize and correct errors in one or more distance sensors, so that, for example, the travel of the device over an edge or tipping or twisting of the device about its own axis may be corrected. Measuring instrument 10 may be moved to the desired point on reference surface 16 where an appropriate marking may be applied to the selected position via the marking device integrated in the device or through opening 30 in the measuring instrument.

If the user wishes to locate a second hole or a second marking at the same level (y=0) as a first reference marking (x=0, y=0) at a defined distance x=L, the deviations of the marking device in y component 20 resulting during a pass of the measuring instrument may not be displayed quantitatively via an appropriate display 26, but the user may only be optically and/or acoustically informed of a deviation in the y direction.

In applications where the exact distance between two or more reference points is not to be determined, but only their level, i.e., the same height, for example, a laser, e.g., a line laser 31 of device 10, which projects a clearly visible trace-like line signal in one or more directions onto the reference surface, may be switched on.

FIG. 2 illustrates such a projection of a laser line 32 on surface 48 of reference surface 16 in a schematic cross-sectional view of the marking device illustrated FIG. 1. A laser 31 in housing 12 of marking device 10 projects a two-dimensionally widened light signal 33 onto reference surface 16, marking a clearly visible line 32 thereon. With the help of leveling unit 44 in device 10, a simple leveling laser is thus obtained, with whose aid appropriate markings may be made on a surface.

The laser may be arranged as a pendulum laser, so that the laser always generates a horizontal laser line 32.

Device 50 for securing the marking device, for example, in a hole 58, is also schematically indicated in FIG. 2. Fastening device 50 arranged as a claw 52 in FIG. 2 may also be arranged as a pin, bracket, clamp, nail, screw, adhesive, etc., for example. This device 50 in or on housing 12 of marking device 10 may be arranged such that center 28 of opening 30 of the measuring instrument is centered in hole 58 where fastening device 50 is inserted. With the aid of this fastening device 50, marking device 10 may thus be secured in a predefinable first position of a reference surface. According to an alternative method for positioning marking device 10 in a predefinable first position of reference surface 16, the device is only moved with its center 28, as defined by two laser lines 54 and 56, for example, and made visible to the user, exactly over the desired first position of reference surface 16 without fastening device 10 at this point using fastening aids 50. Using reset button 42, output unit, i.e., optical displays 24 and 26 of the marking device, may then be set at zero or a desired starting value at this first referent point. On the basis of this first reference marking, the measuring instrument may be freely moved over reference surface 16 to the desired second position. In this second position, the above-mentioned marking device may apply a marking on reference surface 16.

Marking device 10 may also be used for positioning a first marking, which, for example, is to have a defined distance to a corner or an edge of a wall, etc. For this purpose, the housing edges of device 10 are positioned onto the corner or edge of the wall. Sensors 60 may be mounted on the housing edges for this purpose. These sensors detect a contact with a corner element or edge element and displace the reference point of the distance measurement from center 28 of opening 30 in housing 12 of the marking device to the plane of the side resting on the edge, for example, side 36 of housing 12 in FIGS. 1 and 2, and display this displacement of the zero point of measurement automatically in the output unit of the marking device.

Balls 14 of tracking system may also be similarly arranged as contact switches, which detect whether marking device 10 is resting on a reference surface 16 and, if so, automatically turn on the device. Alternatively, this may also take place via optical sensors 60, which are arranged as wall contact sensors and make positive feedback of the wall contact to the control and analyzing unit of marking device 10 possible.

Optical sensors of this type may also be used in tracking system to detect and quantify the distance covered by marking device 10. Herein, balls may also be used as displacement aids, as illustrated in FIG. 2. However, other aids such as felt gliders or simply the housing base of the device facing the reference surface may also be used.

The entire control and analysis electronics, as well as the power supply of marking device 10 may be integrated in housing 12 of the device, so that a standalone, freely displaceable marking device is available to the user.

What is claimed is:

1. A marking device, comprising:
a first device adapted to position the marking device in a predefinable first position of a reference surface;
a second device adapted to level the marking device relative to the reference surface; and
a tracking system adapted to determine a distance covered by the marking device relative to the first position, the tracking system adapted to detect movement of the marking device on the reference surface in two orthogonal directions.

2. The marking device according to claim 1, wherein the marking device is arranged as a hand-held marking tool adapted to position markings on walls, ceilings and floors.

3. The marking device according to claim 1, wherein the tracking system is arranged as a mechanical measurement system.

4. The marking device according to claim 1, wherein the tracking system is arranged as an optomechanical measurement system.

5. The marking device according to claim 1, wherein the tracking system includes at least one ball adapted to roll over the reference surface.

6. The marking device according to claim 1, further comprising an optical signal device adapted to generate at least one piece of directional information.

7. The marking device according to claim 6, further comprising a device adapted to level the optical signal device relative to the reference surface to generate the directional information.

8. The marking device according to claim 6, wherein the optical signal device is self-leveling.

9. The marking device according to claim 6, wherein the optical signal device includes at least one laser.

10. The marking device according to claim 1, further comprising a display device adapted to display a distance value of the marking device from the first position in at least one of the orthogonal directions.

11. The marking device according to claim 1, further comprising a device adapted to mark a second position on the reference surface that corresponds to a predetermined distance to the first position.

12. A marking device, comprising:

means for positioning the marking device in a predefinable first position of a reference surface;

means for leveling the marking device relative to the reference surface; and tracking means for determining a distance covered by the marking device relative to the first position and for detecting movement of the marking device on the reference surface in two orthogonal directions.

* * * * *